A. A. HARMON.
Wheel Cultivator.
No. 84,184.  Patented Nov. 17, 1868.
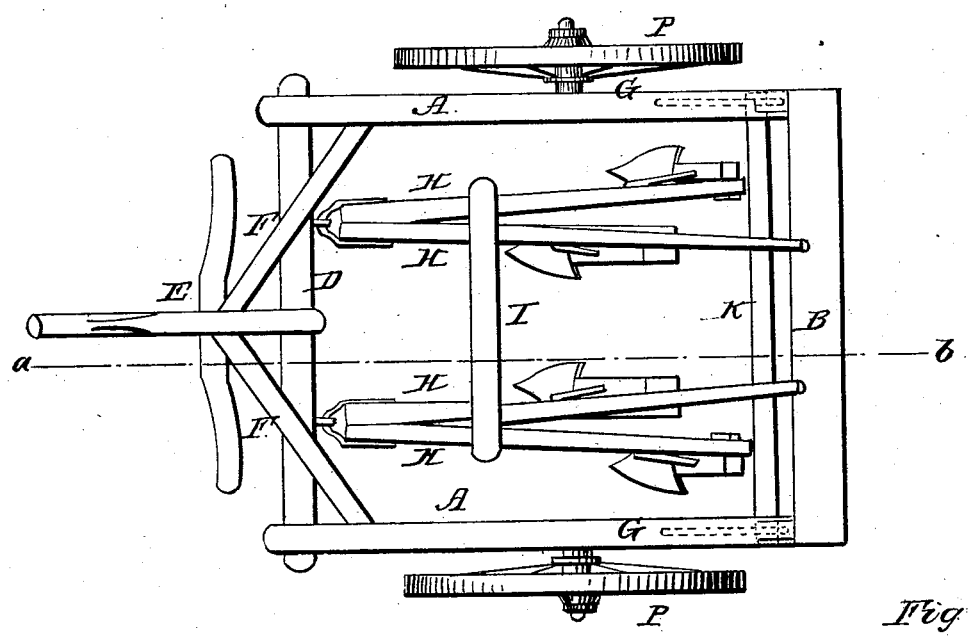
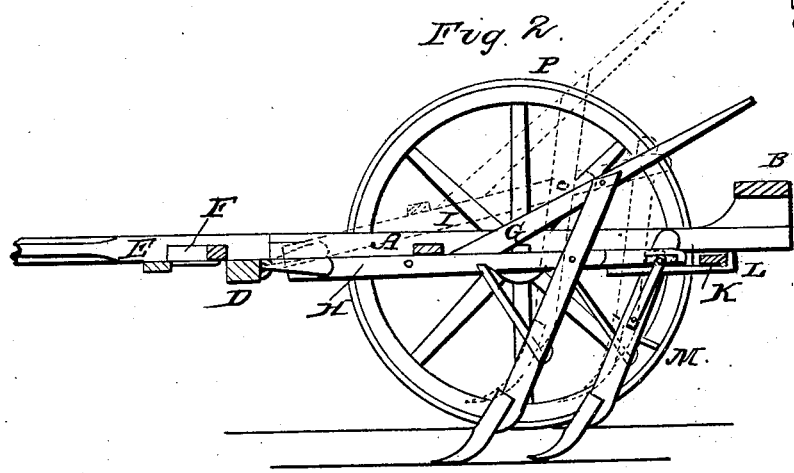
WITNESSES  INVENTOR

United States Patent Office.

ABRAM A. HARMON, OF OLNEY, ILLINOIS.

Letters Patent No. 84,184, dated November 17, 1868.

IMPROVEMENT IN CULTIVATORS.

The Schedule referred to in these Letters Patent and making part of the same.

*To all whom it may concern:*

Be it known that I, ABRAM A. HARMON, of Olney, in the county of Richland, and State of Illinois, have invented a new and useful Improvement in Cultivators; and I do hereby declare the following to be a full, clear, and exact description thereof, reference being had to the accompanying drawings, which are made a part of this specification, and in which—

Figure 1 is a top view or plan.

Figure 2 is a longitudinal vertical section on the line *a b*, fig. 1.

Figure 3 is a detached view of a portion of one of the longitudinal bars of the frame, to exhibit the provision for shifting the axle forward or backward in order to balance the frame.

My machine has two double-shovel or other plows, adapted to run on the respective sides of a row of corn, potatoes, or other crop similarly cultivated. The plows work in unison at a regulated distance apart, having a parallel motion as they are adjusted laterally. They are hung by clevises to the forward transverse bar of the frame, and are supported clear of the ground by a sliding bar, brought into requisition when necessary.

The frame has an open interior, so that swaying and vertical adjustment of the plows is not interfered with, either by an axle-tree or by the rearward extension of the tongue. To secure this freedom, the wheels run on short axles, attached to the longitudinal bars of the frame, and the rear end of the tongue terminates at about the forward transverse bar of the frame.

The tongue is braced to the frame by diagonal bars, which are bolted or framed to the meeting bars of the frame, which unite to form the front corners, and the three bars of the frame, the tongue and the two diagonals, combine to stiffen and brace each other, without the intervention of bars or bridge-pieces to span the frame, and detract from the perfect freedom of motion of the plows under the guidance of the operator.

At the rear of the frame is a cross-bar, supporting or forming the seat.

The axles of the wheels are attached to blocks, which are secured beneath the frame, at points near to or farther from the rear, according as it is desired to adapt the machine for a rider or for a person to walk behind.

In the drawings, A A are the side-bars of the frame, B, the rear bar, which forms the seat, and D, the front bar, which is braced to the said side bars A A, and to the tongue E, by means of the diagonal bars F F.

The frame, thus constructed, rests on short axles, secured to blocks, G, which are fastened in mortises beneath the side bars.

When the machine is adapted for the operator to walk and drive, the blocks occupy the forward notches, as in the figs. 1 and 2; but when the weight of the rider is imposed upon the seat on the rear bar, it is necessary otherwise to adjust the frame on its supports, or, in other words, to shift the supports to the rear to balance the frame under the changed circumstances. In this case the blocks are shifted to the rear notches, *d*, exhibited in fig. 3.

In the drawings are shown two double-shovel plows, one adapted to go on each side of the row of corn or potatoes, and to be moved to the near or off side, as may be required, in order to accommodate them to the sinuosities of the row.

I may, however, choose to use shares of a shape to turn a furrow towards or from the row, according to the size and character of the plants of the growing crop, as in hilling potatoes, &c.

The plows H are attached by clevises to the front transverse bar, D, of the frame, and are managed by the operator, who walks behind or sits on the seat, as he may elect.

When the plow-points rest on the surface, the rear portion of their beams is higher than the clevis-ends, and they tend to enter the ground, as the team advances, their usual working-depth bringing them to a position where the beams are horizontal, as shown in fig. 2.

The plows H are connected by a pivoted bar, I, which maintains their relative distance, so that as they are swayed laterally, to conform to the irregularities of the row, they preserve their distance and parallelism, the bar I maintaining a position parallel to the front bar D. A plurality of holes in the bar I admits the adjustment of the plows as to relative distance.

By this means, lateral force applied to one plow is conveyed to the other, and, under ordinary circumstances, one hand has considerable liberty to be otherwise applied, to gather and shorten in the reins, or for any of the incidental necessities which accompany sedulous and protracted labor in the field.

When the plows arrive at the end of the row, or the machine is travelling towards or from the field, the plows are lifted by hand, and the foot-bar K slipped forward in its holders L, beneath the bars A, so that the pins M, on the rear of the plow-standards, may rest on the said bar K, as shown in red lines in fig. 2.

Owing to the freedom of motion of the plows in the frame, they may be retained in their proper working-position in the soil, even though the wheels P may run over inequalities in the ground.

Having described my invention,

What I claim as new, and desire to secure by Letters Patent, is—

1. The plows H H, attached by clevises to the front bar of the diagonally-braced open frame A B D E F, and connected by a cross-bar, I, which admits their adjustment as to relative distance, and causes them to swing by a parallel motion as they are deflected laterally, substantially as described.

2. In combination with the said plows, thus attached and connected, the sliding foot-bar K, arranged as described, and adapted to hold them in elevated position, for the purposes described.

To the above specification of my invention, I have signed my hand, this 22d day of August, 1868.

ABRAM A. HARMON.

Witnesses:
J. W. EIDSON,
E. H. CHAPIN.